FIG. I

INVENTOR
PHILIP OHRINGER
BY
ATTORNEYS

INVENTOR
PHILIP OHRINGER
BY
ATTORNEYS

INVENTOR
PHILIP OHRINGER
ATTORNEYS

Dec. 13, 1960     P. OHRINGER     2,963,832
MACHINE TOOL CONTROL
Filed Dec. 19, 1958     5 Sheets-Sheet 5

INVENTOR
PHILIP OHRINGER
BY
ATTORNEYS

United States Patent Office 2,963,832
Patented Dec. 13, 1960

2,963,832
MACHINE TOOL CONTROL

Philip Ohringer, Flushing, N.Y., assignor to Cutler-Hammer, Inc., Milwaukee, Wis., a corporation of Delaware Filed Dec. 19, 1958, Ser. No. 781,613

16 Claims. (Cl. 51—165)

This invention relates to infeed control apparatus for a grinding machine.

Grinding machines are commonly employed to produce parts of accurate size, and there is a continuing demand for holding parts to closer tolerances. It is difficult to meet these demands without serious increase in the cost per part. Particularly in the case of machines already in use, these demands often cannot be met except by repeated grinding of a given part, or by greatly increasing the grinding time, and sometimes not then.

It is a principal object of the present invention to provide an infeed control for a grinding machine which is comparatively simple and low cost, and yet enables the holding of part size in production within narrow tolerance limits. The infeed control apparatus can often be added to machines already in use by comparatively simple modifications thereof, and of course can be incorporated in new machines.

The invention will be described in connection with a centerless grinder, wherein it is especially useful, but it will be understood to be applicable to the control of infeed of grinders of other types, such as those where the workpiece is held between centers during the grinding operation.

A centerless grinder commonly has a grinding wheel, a regulating wheel, and a workrest blade. The regulating wheel holds the workpiece against the grinding wheel and imparts rotation thereto, and the workrest blade supports the workpiece between the wheels. Although either the grinding wheel or regulating wheel, or both, can be arranged for translation (infeed) during the grinding operation, most commonly only the regulating wheel translates. The invention will be particularly described in connection with the latter arrangement, but its more general application will be understood.

Commonly a workpiece is placed in position with the regulating wheel retracted, and the grinding cycle is started by rapidly advancing the regulating wheel until the workpiece is nearly in contact with the grinding wheel. At this point the advance of the regulating wheel is changed to a slower rate suitable for grinding. In many machines only a single grinding infeed rate is employed. Less commonly, two or more successively slower rates are employed. In the latter case the final rate may be termed a "slow" or "fine" infeed during which final grinding to size takes place, and the preceding rates may be termed "fast" or "coarse" infeeds during which material is initially removed more rapidly.

It has also been proposed to stop infeed for a desired interval at some point intermediate the initiation of grinding and the point where infeed stops. This tends to insure that the part is round before the final grinding to size takes place. In one such arrangement the infeed rate changes continuously throughout the grinding portion of the cycle, so that near the end of the final grinding the infeed rate is slower than theretofore.

At the end of the infeed, translation of the regulating wheel is stopped but residual grinding may continue during a so-called "dwell" or "spark-out" period. During the dwell period, when employed, there is no relative movement between grinding and regulating wheel slides, but some material is still removed because of the unstressing of deformed members which tends to move the wheel surfaces closer together.

Although the principal factor in determining the final dimension of the part is the position at which the regulating wheel is stopped at the end of the infeed, other factors become important when it is desired to hold parts to a narrow tolerance, say, one or two ten-thousandths of an inch.

The ultimate limit on the tolerance which can be maintained is imposed by machine scatter. This scatter may be considered to be the spread in the output part size from part to part if the elements of the machine that determine part size are brought into exactly the same relationship with one another as each part is ground. In practice it is found that the tolerance that can be held in production is considerably greater than the machine scatter, due to many factors. The accuracy with which the regulating wheel may be brought to its desired final or end position is an important factor in maintaining a narrow tolerance. The duration and rate of infeed during the final grinding to size is also important. The length of the dwell time is a factor. In addition, variations in input part size often have an effect on output part size, and hence limit the tolerance that can be maintained in production.

In one common construction of centerless grinders the regulating wheel is mounted on a slide which is moved by a lead screw and nut for infeed and retraction. In non-automatic machines, infeeding is often a manual operation, wherein an operator rotates the lead screw or nut by means of a lever arm. In such case, maintaining a narrow tolerance requires the careful attention of a skilled operator, and often does not suffice. In order to improve accuracy, such manual operation is often replaced by rotating the lead screw or nut by a suitable power source, such as a pneumatic or hydraulic drive. By controlling the feed rates and automatically controlling the dwell time, considerably improved operation with closer tolerance limits can be obtained. However, the tolerances are still far from approaching the ultimate capability of the grinder, and often several grinds are required to obtain output parts of desired precision.

It has been proposed to control translation of the regulating wheel slide by incorporating mechanical stops in the translation inducing mechanism, that is, in the drive mechanism which produces movement of the slide. This assumes that if the translation inducing mechanism can be made to repeat itself accurately, the slide will also repeat accurately. In the course of developing the system of the present invention, however, it was found that this assumption is not true under many conditions encountered in practice. If no grinding is being done, control of the translation inducing mechanism may yield a slide repeatability of considerable accuracy. However, when parts are ground the slide repeatability is not satisfactory. Thus, it has been found that the final slide position varies considerably depending upon the input part size, even though the translation inducing mechanism works against a positive stop. This variation in input part size causes a varying load on the grinding mechanism resulting in a different amount of deformation being stored in the translation inducing mechanism for different parts. With successive grinds, the input part variation can be reduced, thus reducing the output part variation. However, this is time-consuming and hence uneconomical.

In accordance with the present invention, the position of the regulating wheel slide (and/or grinding wheel slide if one is employed) is monitored at the slide itself by a gaging device, and the gage information utilized to control the speed changeover between initial and final grinding of the workpiece, and for stopping infeed at the desired end point. It is preferred to employ relatively coarse and fine infeed rates and control the point of speed changeover from one to the other by the gage information. However, when an intermediate dwell is employed, the gage information may be used to advantage to control the point in the slide travel where the speed changeover producing the dwell takes place. Advantageously, the gage information is also used to control the changeover from rapid advance to the initial grinding rate. If more than two rates of infeed are employed, the gage information can also be used to control the additional points of changeover. Means are provided for independently adjusting the end point of travel and the points at which the speeds are changed.

The end point and changeover points are adjusted by the operator during the initial setup of the machine for grinding a part of specified size. If necessary, after one or two parts have been ground and measured, the points may be readjusted. Grinding then proceeds.

As successive parts are ground, the grinding wheel will wear and thermal effects may occur such as to require further adjustment of the end point in order to maintain the desired output part size. Thus as the grinding wheel wears there will be a trend toward oversize. On the other hand, as the grinding wheel heats up it will expand, and there will be a trend toward undersize.

In order to maintain a narrow tolerance it has been found important, whenever the end point is changed, to change also the preceding point of speed changeover so that the duration of the final grinding portion of the cycle remains unchanged. It is believed that this is because of thermal effects taking place during the grinding operation. For example, during grinding the workpiece heats up and expands, so that the size immediately after removal from the machine is greater than after the part has cooled. Other thermal effects may also be present, and possibly distorting influences of different nature. In any event, it has been found that maintaining the final grinding portion of the cycle substantially constant gives excellent results in practice.

Accordingly, the gaging apparatus includes means for simultaneously adjusting the end point and the preceding speed changeover by substantially like amounts. In this manner, the amount of material removed during the final grinding portion of the cycle is maintained substantially constant so that thermal and deformation effects during this portion of the cycle remain approximately the same.

It is also advantageous to change the point at which the driving means is shifted from rapid advance to the initial grinding infeed rate simultaneously with change in the end point, to avoid either contact of workpiece and grinding wheel during rapid advance or increasing the overall time of the grinding cycle. The dwell time after infeed has stopped may be maintained constant by means known in the art, but the initiation thereof is preferably controlled by the gage information which stops infeed.

By employing a gaging device responsive to the movement of the slide with respect to the bed during gaging operation, the gaging mechanism is relatively unstressed, since only relatively small restoring or biasing forces are required in the gage mechanism itself. Consequently, the simultaneous adjustment of end and speed changeover points may be made free of the stresses present in the driving mechanism of the slide. This greatly promotes the accuracy of adjustment and control.

The invention will be more fully understood by reference to the following description of specific embodiments thereof.

Figure 1:
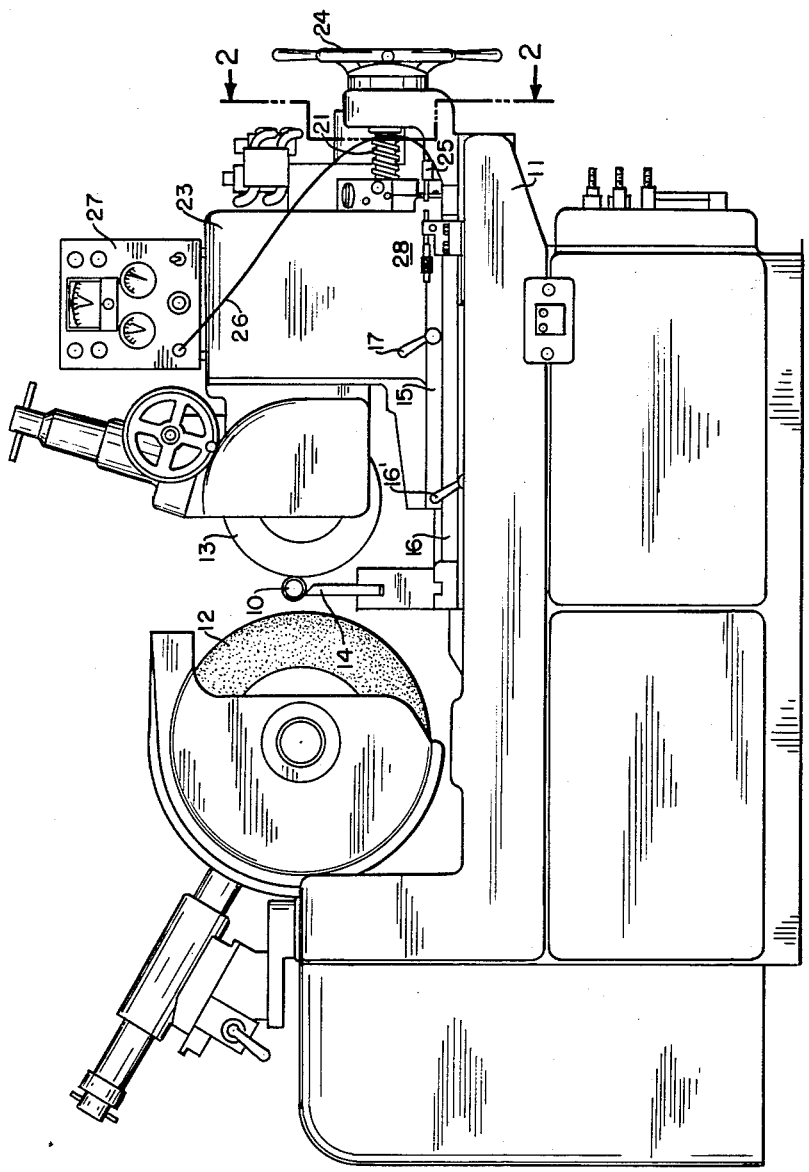
Fig. 1 is an elevation of a centerless grinder in which an electronic gage is employed for control purposes.

Referring now to Fig. 1, a centerless grinder is shown having a machine bed 11, and a grinding wheel 12 mounted on the machine bed. A regulator wheel 13 and workrest blade 14 are shown in their retracted position, and workpiece 10 is supported by blade 14 and rests against the regulating wheel. Suitable sources of power for rotating the grinding and regulator wheels are employed, but need not be described since they are conventional.

Centerless grinders are commonly designed so that they can be used for grinding workpieces of different size. For proper support of the workpiece the relationship between the regulator wheel and the workrest blade is usually adjusted for the particular diameter of the workpiece to be ground. To this end, the regulator wheel 13 and its driving mechanism is mounted on an upper slide 15 and the workrest blade 14 on a lower slide 16. In initial setup the upper slide may be moved along the lower slide until the regulator wheel and workrest blade are in proper position, such as shown in Fig. 1, and the slides locked together by a clamp actuated by lever 17. Thereafter, during the grinding operation, the two slides move as a single unit. Or, lower slide 16 may be moved so that the blade 14 is properly located with respect to the grinding wheel 12 and then locked to the machine bed by clamp lever 16'. In this case only the upper slide moves during the grinding operation.

The upper slide 15 carrying the regulator wheel 13 and associated mechanism is driven by any suitable means. In the specific embodiment here shown, a lead screw 21 and a cooperating nut 22 (Fig. 2) is part of the mechanism. The nut is mounted on casting 23, forming part of the upper slide unit, in bearings which allow rotation thereof but not axial translation. The nut is rotated as hereinafter described in connection with Fig. 2 and, with lead screw 21 held stationary, advances the slide. For coarse adjustment during initial setup, lead screw 21 may be rotated by hand wheel 24, and thereafter clamped.

In order to gate the position of the slide with respect to the bed during infeed, a gaging device having a sensing means actuable by a gage actuating means is provided. Either the sensing means or the gage actuating means is fixedly mounted with respect to the machine bed 11, and the other fixedly mounted with respect to the slide 15 during the gaging operation. In Fig. 1 the gaging device includes a gage probe 25 as the sensing means, and the probe is rigidly mounted on the upper slide 15 and connected by a cable 26 to an electronic gage unit 27. The gage actuating means takes the form of an adjustable actuator 28 which is mounted on the machine bed 11.

Figure 3:
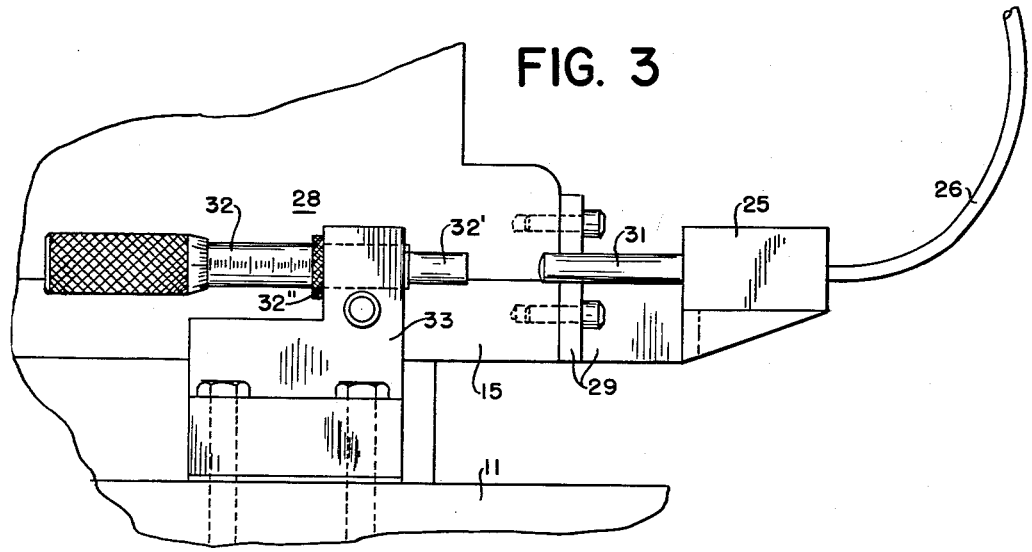
Fig. 3 is a detail of the gage actuating means and sensing probe of Fig. 1.

Fig. 3 shows the gage probe 25 fixedly mounted with respect to the upper slide unit 15 by means of a bracket 29. The probe has a movable element here shown as a plunger rod 31 axially movable in the housing of probe 25. Inside the housing is a variable differential transformer whose output is controlled by movement of plunger rod 31. This will be described more fully hereinafter in connection with Fig. 4.

The adjustable actuator 28 is here shown as a micrometer 32 mounted in a bracket 33 which is bolted to the bed 11 of the machine. As the slide 15 moves inwards, plunger rod 31 contacts the end 32' of the micrometer, thus causing movement of the rod in its housing and consequent actuation of the gaging device. The micrometer arrangement enables the operator to make a rough size adjustment during initial setup, and clamping ring 32'' is then tightened so that the position of end 32' is fixed with respect to the machine bed 11 during operation.

Figure 2:
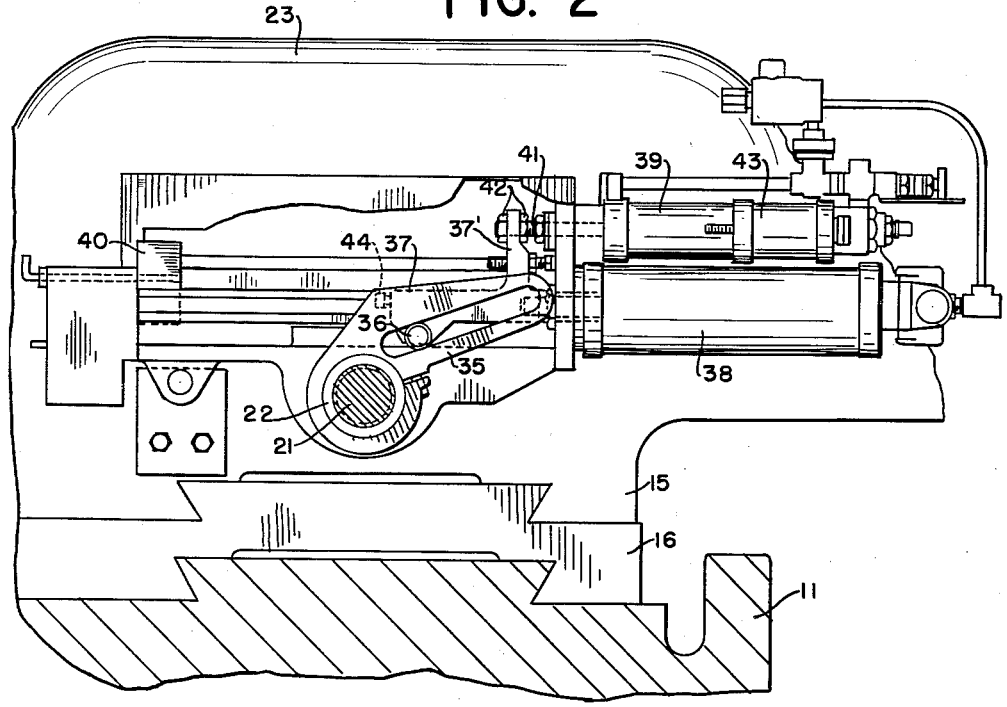
Fig. 2 is a detail showing one form of drive mechanism adapted for control by the gage unit.

Referring to Fig. 2, drive means is shown of a type which is commercially available and manufactured by The Bellows Company. Here a slotted cam 35 is clamped to nut 22 which threadedly engages lead screw 21. A roller bearing cam follower 36 is attached to cross head 37 which is driven by an air motor 38. An hydraulic check unit 39 has a piston rod 41 attached to an arm 37' of the cross head by nuts 42. An oil reservoir 43 is provided for the check unit 39. The operation and control of the air motor and check unit will be described hereinafter in connection with Fig. 4.

In normal infeed operation, lead screw 21 is held against rotation and the air motor 38 drives the slotted cam 35 to the left, thereby rotating nut 22 and causing advance of the upper slide unit 15 carrying the regulator wheel. This brings the workpiece 10 (Fig. 1) into engagement with the grinding wheel 12 and grinding proceeds. Due to the slotted cam arrangement, uniform movement of cross head 37 will produce a non-uniform rotation of feed nut 22 which moves the slide more slowly toward the end of travel. However, it is here contemplated to produce a speed changeover in the movement of the cross head, as will be described hereinafter.

To facilitate initial setup, a rotatable stop 40 is provided which is suitably mounted on the drive unit. In normal grinding, the stop is in its upper position as shown in full lines, wherein it is ineffective. However, during initial setup as described hereinafter, the stop is rotated to the lower position shown in dotted lines wherein it is in the path of travel of cross head 37. A screw 44 is carried by the cross head 37, and when it strikes stop 40 further movement of the cross head is prevented.

Figure 4:
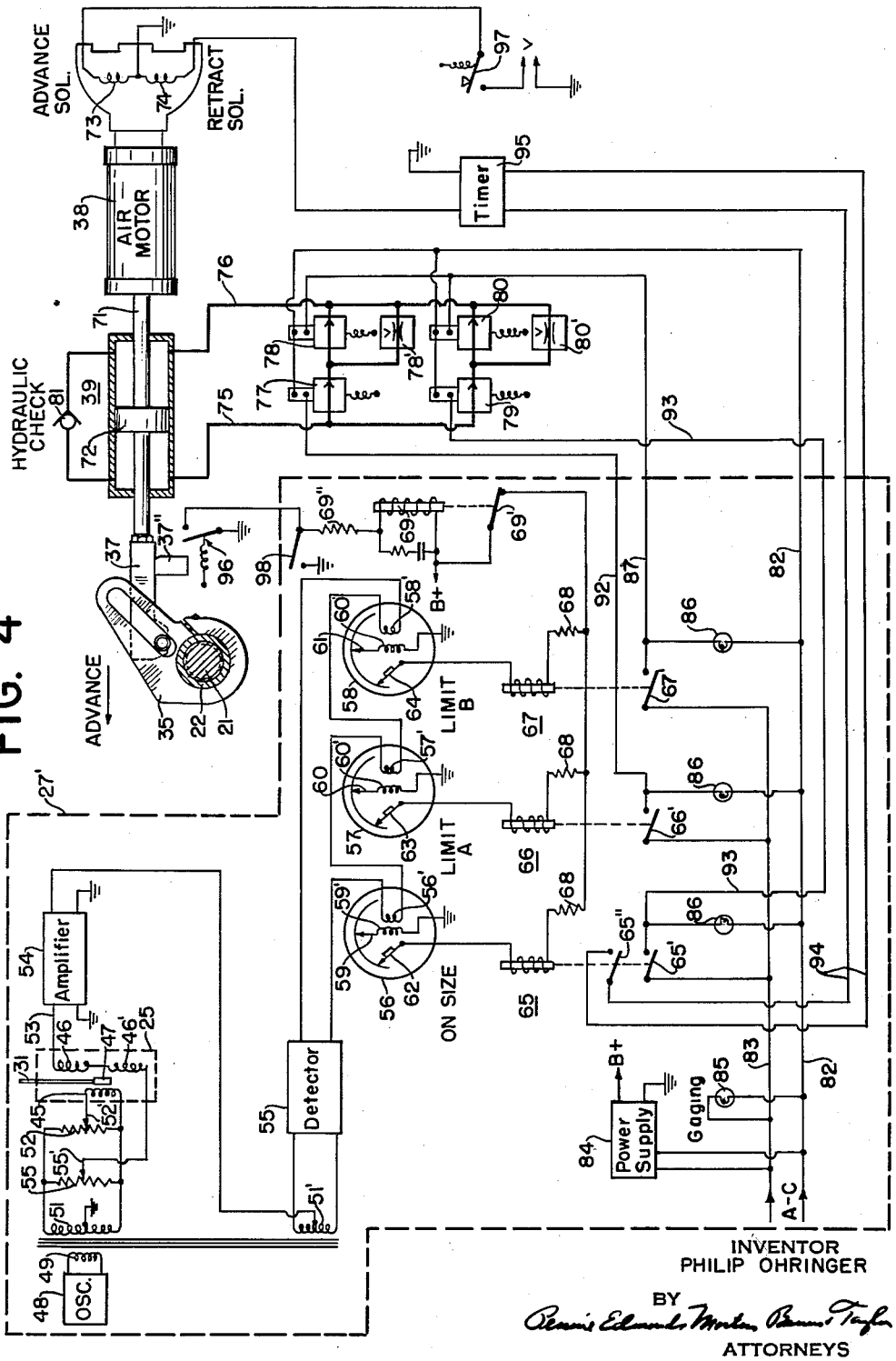
Fig. 4 is a circuit diagram of the electronic gage and the control arrangement for the drive source.

Referring now to Fig. 4, a linear variable differential transformer is shown comprising a primary coil 45 and a pair of secondary coils 46, 46' connected in opposition. A core 47 is mounted on plunger rod 31 for axial movement. The whole is mounted in a housing 25 which, as before described, is attached to the upper slide unit. The rod 31 may be arranged for axial movement in any desired fashion, such as a bearing with a spring arranged to bias the rod in the forward direction, a pair of cantilever springs, etc.

The differential transformer is connected with an electronic gage unit 27, as described in connection with Fig. 1, and the circuitry is shown within the dotted outline 27' in Fig. 4. Here an oscillator 48 supplies oscillations of suitable frequency to the primary 49 of a transformer whose center-tapped secondary 51 is connected to a potentiometer 52 which in turn is connected to the primary 45 of the differential transformer. By moving slider 52', the amplitude of the oscillation supplied to the differential transformer may be changed, thus providing an overall gain control in the gage unit for calibration purposes.

As is well known, a differential transformer gives an A.-C. output which is a minimum at the central or null position of the core 47, and ideally is zero. The A.-C. output increases in amplitude with departures of core 47 from its null position, and the phase of the output reverses on opposite sides of the null. The output of the differential transformer is supplied through line 53 to amplifier 54. The output of the amplifier is connected to the center tap of transformer secondary 51' and hence to the detector 55. The secondary 51' receives the output of oscillator 48 and supplies it to detector 55. The detector is arranged to give a D.-C. output which varies in amplitude with the amplitude of the A.-C. voltage in line 53, and is of opposite sign for opposite phase of the differential transformer output in line 53.

An electrical circuit is provided for zeroing and size adjustment of the gaging unit. To this end, potentiometer 55 is connected across the secondary 51 and the voltage at slider 55' added in series with the voltage induced in secondaries 46, 46' of the differential transformer. By moving slider 55', an A.-C. voltage of adjustable amplitude which is either in-phase or out-of-phase with the output voltage of the differential transformer may be obtained. Accordingly, the physical position of core 47 corresponding to a given output in line 53 (and vice versa) may be changed by adjusting potentiometer 55. Suitable phase-shifting circuits may be employed to insure exact in-phase or out-of-phase relationship of the voltage from potentiometer 55 and the output of the differential transformer.

This type of gage unit is described in application Serial No. 614,931, filed October 9, 1956, by Torn and Philbin for "Machine Tool Gaging and Control." Details of detector 55 and further details of the other portions of the circuit are shown and described, and reference may be made thereto if desired.

Three meters 56, 57 and 58 are respectively denoted "On Size," "Limit A" and "Limit B." The actuating coils 56', 57' and 58' are shown connected in series to receive the output of detector 55. The meters are provided with pointers 59, 60 and 61 cooperating with appropriate scales to give gaging indications. The meters also have settable pointers 62, 63 and 64 arranged to establish respective electric circuits when contacted by the pointers 59, 60 and 61. In effect, in meter 56 the settable pointer 62 and indicating pointer 59 form a switch which is closed when the position of the indicating pointer coincides with that of the settable pointer, and similarly for the other meters. In practice, the indicating and settable pointers have a common axis of rotation, but are here shown offset for clarity of presentation. Series coils 59', 60' and 61' are provided for corresponding pointers so that, when a given indicating pointer contacts its settable pointer, the series coil will be energized to hold the pointers together. Such meters are known in the art and need not be described in further detail.

Relays 65, 66 and 67 have their actuating coils connected to settable pointers 62–64, respectively. The actuating coils are connected through respective resistors 68 and the normally closed switch 69' of relay 69 to a source of D.-C. power denoted B+. Thus, when the indicating pointer of any meter makes contact with its settable pointer, the corresponding relay is energized. The series resistor 68 in each relay circuit is to limit the current to a desired value.

In this embodiment relay 67 associated with the Limit B meter controls the speed changeover from rapid advance to coarse infeed, relay 66 associated with the Limit A meter controls the changeover from coarse infeed to fine infeed, and relay 65 associated with the On Size meter stops further infeed. Before describing the manner in which the relays effect their control, the hydraulic control of the driving means for moving the regulator wheel slide will be described.

At the upper right of Fig. 4 there is a schematic representation of the driving means of Fig. 2. Parts have been rearranged for simplicity of presentation. The air motor 38 has a piston rod 71 which drives cross head 37 to produce rotation of the slotted cam 35. The hydraulic check unit 39 has a piston 72 which also moves with the cross head as described in connection with Fig. 2. For simplicity, the piston is here shown as mounted on rod 71.

Control of the air motor is by means of the advance solenoid 73 and retract solenoid 74 which, when respectively energized, produce movement in opposite directions. Internal valve mechanism is provided so that momentary energization of one solenoid produces continued movement in the corresponding direction until the other solenoid is energized. The hydraulic check unit 39 is filled with suitable fluid and opposite ends of the fluid chamber are connected to fluid lines 75 and 76, respectively. Valves 77, 78 and 79, 80 form two parallel paths between fluid lines 75 and 76. Adjustable orifice constrictions 78', 80' are connected in parallel with valves 78, 80, respectively. Thus the valves control fluid flow from one side of piston 72 to the other, thereby controlling the rate of movement thereof during infeed.

The valves are shown schematically and are arranged for solenoid operation and spring-biased to the open position shown. A hydraulic check valve 81 also connects opposite ends of the fluid chamber of the unit 39, and allows free fluid flow during retraction.

Returning now to the gage unit, relays 65–67 operate corresponding relay switches 65', 66', 67' and relay 65 has an additional switch 65". Input power is obtained from a suitable source, such as a 60-cycle A.-C. power main, and is supplied to lines 82 and 83. A rectifier power supply 84 is connected across lines 82, 83 to supply the B+ power for various units in the apparatus. A lamp 85 labelled "Gaging" is connected across the lines to indicate when the gaging unit is in operation. Line 83 is connected to the arms of relay switches 65'–67'. The return line 82 serves as a common connection for indicator lamps 86, and also is connected to one terminal of each of the solenoids which actuate valves 77–80.

The grinding cycle is started by at least momentarily closing switch 97, thus supplying current from a power source V to advance solenoid 73. Valves 77–80 are all open, thus allowing fluid to flow freely from one side of piston 72 to the other. The air motor 38 accordingly moves crosshead 37 at a desired rapid speed, causing rotation of lead screw nut 22 and infeed of the regulator wheel slide in the "Rapid Advance" portion of the cycle.

When the Limit B relay 67 is energized, switch 67' closes to supply current through line 87 to the solenoids which actuate valves 78 and 80, thereby closing the valves and forcing the fluid to flow through constricting orifices 78' and 80'. Thus, fluid flow through lines 75, 76 is restricted, imposing a load on the air motor 38 and causing a speed changeover from rapid advance to coarse infeed. When Limit A relay 66 is actuated, its corresponding relay switch 66' closes and supplies current through line 92 to the actuating solenoid of valve 77, thereby closing the valve. This forces all fluid to flow through orifice 80', thus imposing an additional load on air motor 38 and causing a changeover from coarse to fine infeed. When the On Size relay 65 is actuated, relay switch 65' closes and supplies current through line 93 to the solenoid of valve 79, thereby closing the valve and preventing further fluid flow from line 75 to line 76. This stops further movement of the piston 72, and hence stops further infeed of the regulator wheel slide.

As has been described before, at the end of the fine infeed there may be a dwell period before the slide is retracted. In Fig. 4 actuation of the On Size relay 65 closes switch 65" and short circuits lines 94 leading to the timer 95. This starts the timer and, after the end of a preselected interval, the timer actuates the retract solenoid 74 to withdraw the regulating wheel. If the dwell interval is not employed, relay switch 65" may be arranged to actuate retract solenoid 74 directly.

As the indicating pointers of each of meters 56–58 establishes a respective circuit with its settable pointer to actuate its corresponding relay, the current through respective coils 59'–61' holds the circuits in closed position. Consequently, at the end of the infeed portion of cycle, all three indicating pointers will be in contact with their settable pointers and will remain that way so long as the energizing circuit through relay switch 69' remains established.

Accordingly, a switch 96 is arranged to be actuated when the slide is in its retracted position, as by a projection 37" on the cross head, so as to complete a circuit from B+ through the actuating coil of relay 69 and resistor 69" to ground, thereby actuating the relay. This opens the relay switch 69' and breaks the hold circuits of the meters. When the next grinding cycle is initiated by momentarily closing switch 97, switch 96 opens at the beginning of the rapid advance, thereby deenergizing relay 69 and establishing the energizing circuits for relays 65–67 well in advance of the points at which they are required to produce control outputs.

To facilitate initial setup, a manually operated switch 98 is provided in parallel with switch 96. When closed, switch 98 disables the meter relays 65–67 while allowing the meters themselves to function.

Summarizing the grinding cycle, with the regulating wheel slide in its retracted position, a workpiece is inserted and grinding operation initiated by momentarily closing switch 97 (Fig. 4). This energizes the advance solenoid 73 and starts the cycle. At this time valves 77–80 are open, thus permitting the regulating wheel to be rapidly advanced. As the cross head 37 moves from its fully retracted position, switch 96 opens to establish an energizing circuit through relay switch 69' to the settable pointers of the meters. Upon reaching the point for changeover from rapid advance to coarse grinding infeed, indicating pointer 61 of Limit B meter 58 makes contact with the preset pointer 64, thus actuating relay 67 to open valves 78 and 80 as previously described. The hydraulic control unit 39 thereby causes a change from rapid advance to coarse infeed, fluid flowing through both orifices 78' and 80'. When the point is reached for changeovers from coarse to fine infeed, Limit A meter 57 closes its contacts to actuate relay 66 and open valve 77 so that fluid can flow only through orifice 80'. When the On Size meter 56 closes its contacts, actuation of relay 65 closes valve 79 to stop further travel of the regulating wheel slide and also starts timer 95.

At the end of the predetermined dwell period, timer 95 energizes the retract solenoid 74 to withdraw the regulating wheel slide to its initial position. This closes switch 96 to break the hold circuits of the meters. The workpiece may then be removed, a new one inserted and starting switch 97 again closed. In automatic machines provision may be made for automatically removing finished pieces, inserting new pieces and closing switch 97 at the end of each cycle.

A suitable setup procedure will now be described for the apparatus of Figs. 1–4. With the regulator wheel slide retracted, switch 98 is closed to disable the relay control circuits, and power turned on for the gage unit. The size control potentiometer slider 55' is set at its midpoint. The settable pointer 62 of the On Size meter is set at zero, and the settable pointer 63 of the Limit A meter is set at the point above zero where it is desired to change from coarse to fine infeed. The settable pointer 64 of the Limit B meter is set for the desired distance above zero for changeover from rapid advance to coarse infeed, due regard being had for variations in input part size and time delay in producing the speed changeover so that the workpiece does not strike the grinding wheel at the rapid advance feed rate. The micrometer head 32 (Fig. 3) is rotated to disengage it from the gage probe and the stop block 40 (Fig. 2) is placed in the lower position shown in dotted lines. Switch 97 is then closed to actuate advance solenoid 73 and infeed allowed to continue until stopped by block 40.

A master part of the desired finished size is placed on the workrest blade 14 and the upper slide 15 moved inwards by rotating the lead screw 21 with wheel 24 until the master part just touches the grinding wheel 12. The lead screw is then locked. The micrometer head 32 is adjusted so that the indicating pointer 59 of the On Size meter just touches the settable pointer 62 (at zero), and the lock ring 32″ of the micrometer tightened. Switch 98 is then opened to deenerize relay 69, thereby closing relay switch 69′ and establishing energizing circuits for the relays 65–67. Since the On Size meter pointer contacts are closed, relay 65 is energized and the slide retracted.

The master part is then removed from the workrest and the stop block 40 moved to its upper position where it is inoperative. The purpose of the stop block is to insure that the initial setup adjustment allows for further travel of the drive means when required by subsequent adjustments.

The feed rates may be set by adjusting orifices 78′ and 80′. When a dwell time is employed, timer 95 may be set as desired.

An unfinished part is then placed on the workrest and switch 97 momentarily depressed to initiate the grinding cycle. When the cycle is completed the part is removed and measured. If the size is off by a considerable amount, say more than 0.002 inch, the lead screw is rotated by wheel 24 the proper amount, and the mircometer head 32 adjusted by the same amount. If the part is oversize, the slide will be advanced and the micrometer backed off, and vice versa for part undersize. On the other hand, if the size is off by an intermediate amount, say less than 0.002 inch but more than 0.0005 inch, the micrometer head 32 may be adjusted by the required amount without rotating the lead screw. If the size is off by only a small amount, say less than 0.0005 inch, the size control potentiometer slider 55′ may be adjusted. Another part may then be ground and further adjustments made if required.

If a master part of finished size is not available, an unfinished part may be measured and placed in position on the workrest. Then, after the slide has been advanced until the part touches the grinding wheel, the part may be removed and the lead screw advanced by wheel 24 by the difference between the actual part size and the desired finished size. Any inaccuracies in this procedure will be observed after a part has been ground, and suitable adjustments made as described above.

As the grinding of parts proceeds, the grinding wheel will wear, so that output parts tends to become oversize. The parts may be gaged as they issue from the machine and, when required, the size control potentiometer 55 adjusted by the amount necessary to correct for the observed error. This will automatically change the final slide position, and will also move the changeover points simultaneously by substantially like amounts. Also, as grinding proceeds, thermal effects may cause the grinding wheel to expand, thus tending to make the parts undersize. When this is obesrved by gaging the output parts, the size control potentiometer 55 may be adjusted accordingly to correct for the error.

The electronic gage described in connection with Fig. 4 has been found satisfactory in practice, but other forms of electronic gages may be employed if desired. Also, instead of electronic gages, other types of gage units may be employed.

Figure 5:
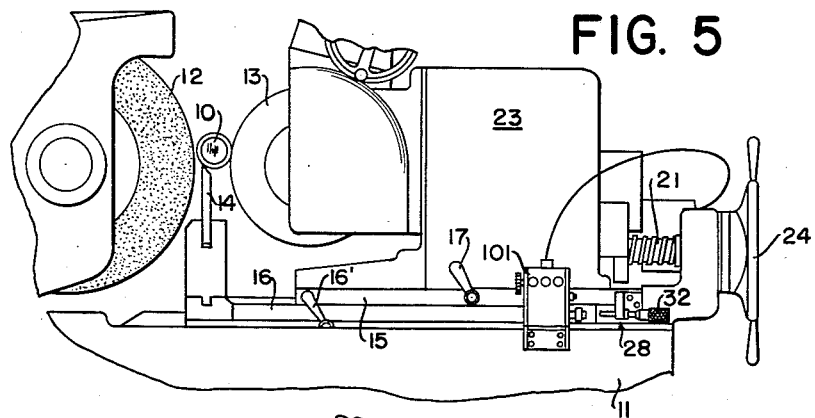
Fig. 5 shows another embodiment of the invention employing a microswitch gage unit.

The embodiment shown in Figs. 5–9 illustrates a simple switching type of gage unit. Referring to Fig. 5, a microswitch gage unit 101 is shown bolted to the machine bed 11. A micrometer gage actuator 28 is employed as before, but here is shown bolted to the upper slide unit 15. It will be understood that in both the arrangements of Figs. 1 and 5 the gage actuator may be fixedly mounted with either the regulator wheel slide or the bed, and the gage or gage sensing means fixedly mounted with respect to the other, during gaging operation.

Figure 6:
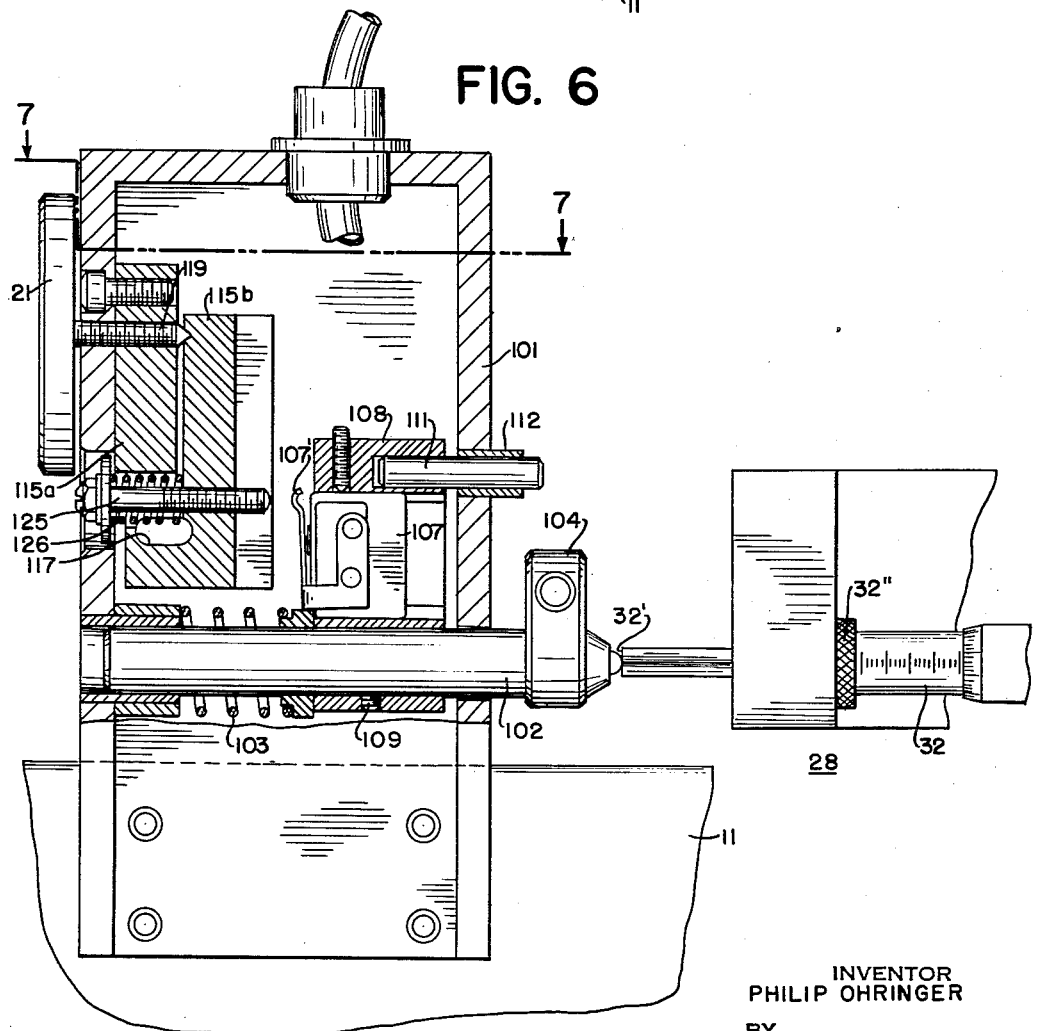
Fig. 6 is a vertical cross-section of the gage unit of Fig. 5.
Figure 7:
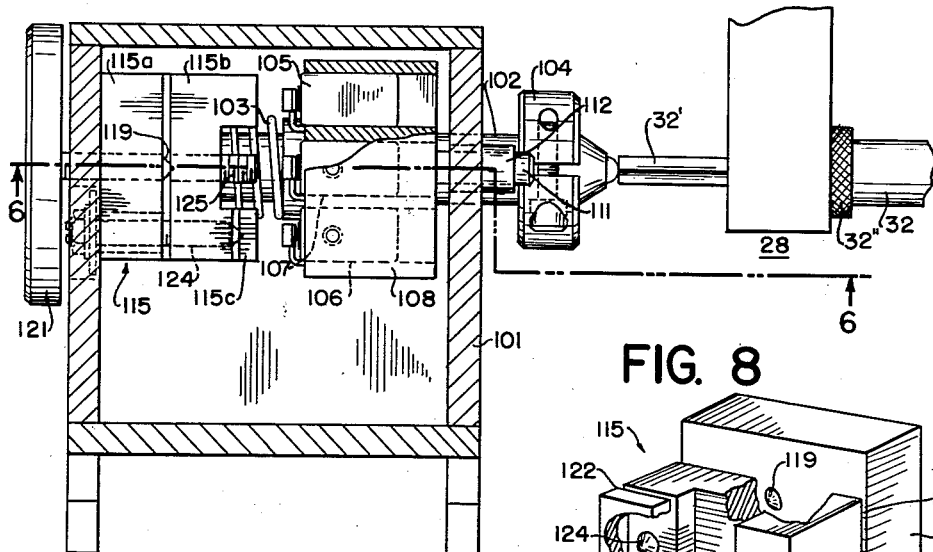
Fig. 7 is a cross-section taken along line 7—7 of Fig. 6.
Figure 8:
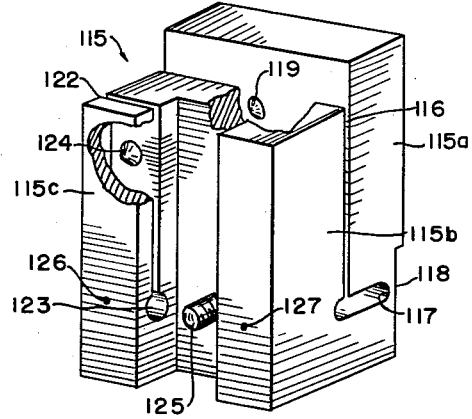
Fig. 8 is a detail of the adjustable block of the gage unit of Figs. 6 and 7.

Referring to Figs. 6 and 7, a piston 102 is journalled in housing 101 and is spring-biased to its forward position by spring 103. A stop 104 is clamped to the piston 102 to limit movement thereof in the rearward direction.

Three switches 105, 106 and 107 are provided for size control, coarse to fine feed control, and rapid advance to coarse feed control, respectively. These switches are advantageously of the microswitch type wherein only a very slight movement of the actuating lever (e.g. 107′, Fig. 6) is required to close and open the switch and wherein the point of closing is repeatable to a high degree of accuracy.

The three switches 105–107 are mounted in a frame 108 which is secured to piston 102 by set screw 109. A pin 111 is secured to the frame 108 and slides in a journal 112 so as to prevent any angular movement of the microswitch assembly during translation thereof by piston 102.

A slotted block 115 is provided for actuating the three switches at different points in the travel of piston 102, with provision for individually adjusting the points of actuation relative to each other, and also provision for simultaneously changing the points of actuation by substantially like amounts. Block 115 is shown in vertical cross-section and horizontal plan views in Figs. 6 and 7, and in perspective in Fig. 8. It is here shown as formed by sawing and milling operations on a single block of metal, so as to facilitate rigidity and accuracy. However, it may be formed of separate pieces if desired, and widely different arrangements may be employed for actuating the switches.

As specifically shown, block 115 comprises a stationary section 115a which is bolted to the housing 101 as shown in Fig. 6. The block is slotted at 116 and laterally bored at 117 to provide a thin section 118 which serves as a spring hinge between sections 115a and 115b. An adjusting screw 119 is threaded in section 115a so that, by rotation of knob 121, the position of section 115b with respect to 115a can be adjusted.

The block is also slotted at 122 and laterally bored at 123 to provide an additional section 115c. A screw 124 is threaded in section 115b and passes freely through section 115a, as indicated in Fig. 7, so as to enable the relative adjustment of section 115c and 115b. Another screw 125 is threaded in block 115b and passes freely through block 115a as best shown in Fig. 6. A compression spring 126 is placed between section 115b and the head of screw 125 to maintain a given adjustment and to eliminate backlash.

As here shown, microswitch 107, which controls changeover from rapid advance to coarse infeed, is actuated upon contact with screw 125. Microswitch 106, controlling changeover from coarse to fine infeed, is actuated upon contact with the front face of member 115c at a point designated 126 in Fig. 8. Microswitch 105, controlling the stopping of infeed, is actuated upon contact with the front face of section 115b at the point designated 127. Points 126 and 127 (Fig. 8) are advantageously on a line with screw 125 so that movement of block 115b by screw 119 will produce like changes in the points at which the three microswitches are actuated.

As will be understood from the foregoing, rotation of knob 121 changes the points in the travel of piston 102 at which all three microswitches are actuated. The points of actuation of microswitches 106 and 107 with respect to that of 105 may be individually adjusted by screws 124 and 125, respectively. Due to the large mechanical ratio, adjustments corresponding to minute changes in the points of actuation of the switches may be readily be made. Knob 121 is advantageously calibrated in decimal parts of an inch, say ten-thousandths or smaller, representing corresponding changes in the longitudinal position of piston 102 at which the switches are actuated. The heads of screws 124 and 125 are also advantageously calibrated.

Figure 9:
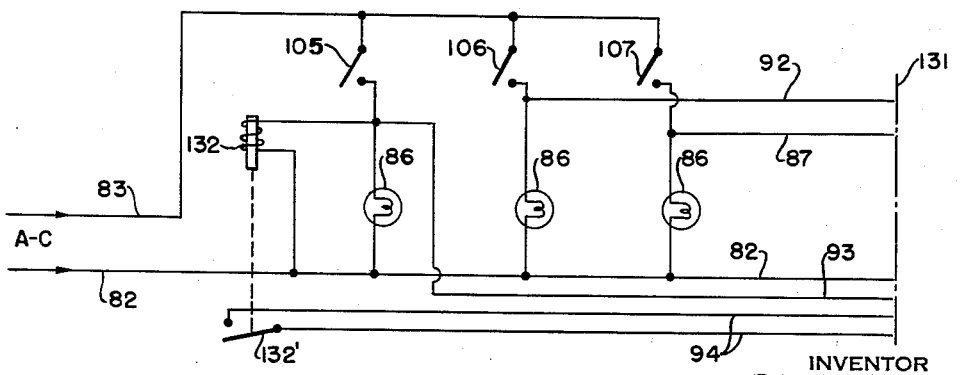
Fig. 9 is a circuit diagram of the gage unit of Figs. 6–8.

In this embodiment the electrical circuitry associated with the gaging and control operation may be quite simple, as shown in Fig. 9. Only the circuits directly associated with the gage unit are illustrated, the remainder of the circuits and the manner in which the drive mechanism is controlled being the same as in Fig. 4. The dotted line 131 indicates the separation between the gaging unit and the hydraulic valve control unit, and the electrical lines have been given the same numbers as in Fig. 4 and control the solenoids of valves 77-80 and the timer 95 in the same manner.

A.C. power is supplied to lines 82, 83 as before, line 82 serving as the common return for lamps 86 and the solenoids of valves 77-80 (Fig. 4). Line 83 is connected to the switch arms of the switches 105, 106 and 107. Upon closure of switch 107, power is fed to line 87 which controls the changeover from rapid advance to coarse grinding infeed as before. When switch 106 closes, power is supplied to line 92 to control changeover from coarse to fine grinding infeeds. Similarly, when switch 105 closes, power is supplied to line 93 to stop further advance of the regulator wheel slide. Closure of switch 105 also actuates relay 132 and closes the relay switch 132', thereby short-circuiting lines 94 to start the timer 95 (Fig. 4).

The initial setup may be similar to that described for Figs. 1-4. Size control knob 121 may be set at zero and screws 124 and 125 adjusted for the desired changeover points by suitable calibrations associated with the screw heads. The stop 40 may then be lowered and the drive means advanced until it strikes the stop. With a master part in place, the upper slide 15 is moved in by rotating the lead screw until the part just touches the grinding wheel. Micrometer head 32 is adjusted until the lamp associated with microswitch 105 lights, and the clamp ring 32" tightened. Then the master part is removed, stop 40 moved to its inoperative position, and a part ground and measured. Readjustments are then made as before, knob 121 being used to correct for small errors. Thereafter, in operation, when changes in the output part size are noted, knob 121 may again be adjusted.

In both of the embodiments specifically described, it will be noted that the position of the regulator wheel slide with respect to the machine bed is gaged so that the changeover and end points are unaffected by deformations in the mechanism which drives the slide, thereby obtaining slide repeatability. Also, the adjusting means for changing the location of these points is substantially unloaded. This is clear in the embodiment of Figs. 1-4, wherein the current through the meters is adjusted electrically and is independent of the load on the slide. In the embodiment of Figs. 5-9, the screws in block 115 are loaded only by the spring action at the various hinge points, which is independent of the load on the slide. This greatly facilitates accuracy of gaging the slide position, and adjustment of end and changeover points. When the end point of travel of the regulator wheel slide must be changed due to wheel wear, the thermal effects, etc., the changeover from coarse to fine infeed is simultaneously changed, so that the length of the final grinding portion of the cycle remains the same and output parts may continue to be held within very narrow tolerances. Further, the switch controlling the end point also actuates the timing means so that changing the end point of travel does not change the duration of the dwell interval.

The point of changeover from rapid advance to coarse grinding speed is also changed simultaneously with the end point. Thus when the end point is moved inwards to correct for oversize parts (e.g. due to wheel wear) there is no increase in the overall time of the cycle. On the other hand, when the end point is moved outwards to correct for undersize parts (e.g. due to thermal expansion of the wheel), there is no danger of the workpiece contacting the grinding wheel during rapid advance when only a small margin of safety has been allowed in initial setup.

In the two specific embodiments described, both coarse and fine grinding speeds are employed, and there is no intermediate dwell. Such an arrangement has been found to give excellent results in practice. However, the embodiments may readily be arranged to provide an intermediate dwell, with or without change of infeed rate. Thus in Fig. 4 the Limit A relay switch 66' may be arranged to energize the solenoids of valves 77 and 79 through a timer which breaks the energizing circuit to both valve solenoids after a preset interval. This will stop infeed for the preset interval and thereafter allow final grinding to proceed at the rate determined by orifices 78' and 80'. In such operation one of the parallel valve circuits between fluid lines 75 and 76 could be omitted.

Or, the additional timer may be arranged to open valve 79 after the preset interval but maintain valve 77 closed, thereby providing a slower infeed after the intermediate dwell. The latter operation can also be obtained by allowing relay switch 66' to control valve 77 as shown in Fig. 4, and providing a second switch for relay 66 which closes valve 79 through a timer which opens the valve after a preset interval.

It will be understood that in such arrangements the point of speed changeover which produces the intermediate dwell will be determined by the gage signal, and that this point will be changed simultaneously with change of end point. Thus the length of the final grinding portion of the cycle will remain unchanged.

In Fig. 9 similar operations can be obtained by arranging switch 106 to perform the functions described for relay switch 66' of Fig. 4, with an additional pair of contacts when required. These and other modifications can be made within the spirit and scope of the invention.

Two types of gaging equipment have been described hereinbefore, but it will be understood that many different types of gaging equipment may be used as meets the requirements of the particular application. Also, modifications may be made in gaging equipment of the types specifically described herein. Certain features of the invention may be employed and others omitted, if desired.

Although the invention has been specifically described in connection with centerless grinders wherein only the regulator wheel slide translates during grinding operation, it can be adapted to machines wherein the grinding wheel is mounted on a slide which translates during grinding operation, or where both wheel slides are translated. The manner in which these adaptations may be made will be clear to those skilled in the art. The invention may also be applied to infeed grinders of the type wherein the workpiece is held between centers. In this case the grinding wheel is customarily mounted on a slide and advanced toward the workpiece. The gage unit and gage actuating means will then be mounted to gage directly the position of the grinding wheel slide with respect to the machine bed. These and other modifications and applications of the invention will be clear to those skilled in the art.

I claim:

1. Infeed control apparatus for a grinding machine having a machine bed, a wheel slide movable inwards to bring a workpiece and grinding wheel into grinding engagement, and infeed driving means for said slide controllable to produce an infeed speed changeover between initial and final grinding of said workpiece, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at at least two positions of said slide, means utilizing the control output at one of said positions for controlling said speed changeover and at the other of said positions for stopping infeed, and means for changing simultaneously by substantially like amounts the positions of the slide at which said control outputs are produced.

2. Infeed control apparatus for a grinding machine having a machine bed, a wheel slide movable inwards to bring a workpiece and grinding wheel into grinding engagement, and means for infeed of said slide at relatively coarse and fine grinding rates, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at at least two positions of said slide, means utilizing the control output at one of said positions for changing from coarse to fine grinding infeed of said slide and at the other of said positions for stopping infeed, and means for changing simultaneously by substantially like amounts the positions of the slide at which said control outputs are produced.

3. Infeed control apparatus for a grinding machine having a machine bed, a wheel slide movable inwards to bring a workpiece and grinding wheel into grinding engagement, and means for infeed of said slide at relatively coarse and fine grinding rates, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at at least two positions of said slide, means utilizing the control output at one of said positions for changing from coarse to fine grinding infeed of said slide and at the other of said positions for stopping infeed, means for changing one of the positions of the slide at which a control output is produced with respect to the other, and means for changing simultaneously by substantially like amounts both of the positions at which said control outputs are produced.

4. Infeed control apparatus for a grinding machine having a machine bed, a wheel slide movable inwards to bring a workpiece and grinding wheel into grinding engagement, and means for infeed of said slide at relatively coarse and fine grinding rates, which comprises a gaging device including sensing means, gage actuating means, one of said sensing and gage actuating means being fixedly mounted with respect to said slide and the other fixedly mounted with respect to said bed during gaging operation, said sensing means having movable means actuated by said gage actuating means to produce control outputs from said gaging device at at least two positions of said slide, means utilizing the control output at one of said positions for changing from coarse to fine grinding infeed of said slide and at the other of said positions for stopping infeed, and means for changing simultaneously by substantially like amounts the positions of the slide at which said control outputs are produced.

5. Infeed control apparatus for a grinding machine having a machine bed, a wheel slide movable inwards to bring a workpiece and grinding wheel into grinding engagement, and driving means controllable to produce infeed of said slide at relatively coarse and fine grinding rates, which comprises a gaging device including sensing means, gage actuating means, one of said sensing and gage actuating means being fixedly mounted with respect to said slide and the other fixedly mounted with respect to said bed during gaging operation, said sensing means having movable means actuated by said gage actuating means to produce control outputs from said gaging device at at least two positions of said slide, means utilizing the control output at one of said positions for changing said driving means from coarse to fine grinding infeed and at the other of said positions for stopping said driving means, means for changing one of said positions of the slide at which a control output is produced with respect to the other, and means for changing simultaneously by substantially like amounts both of the positions at which said control outputs are produced.

6. Infeed control apparatus for a grinding machine having a machine bed, a wheel slide movable inwards to bring a workpiece and grinding wheel into grinding engagement, and infeed driving means for said slide controllable to produce an infeed speed changeover between initial and final grinding of said workpiece, which comprises a gaging device including sensing means, gage actuating means, one of said sensing and gage actuating means being fixedly mounted with respect to said slide and the other fixedly mounted with respect to said bed during gaging operation, said sensing means having a movable member actuated by said gage actuating means, a pair of switches in said gaging device actuated at spaced points in the travel of said movable member, means responsive to one of said switches for controlling the point of said speed changeover and means responsive to the other of said switches for stopping infeed, and means for changing simultaneously by substantially like amounts the points at which said switches are actuated.

7. Infeed control apparatus for a grinding machine having a machine bed, a wheel slide movable inwards to bring a workpiece and grinding wheel into grinding engagement, and means for infeed of said slide at relatively coarse and fine grinding rates, which comprises a gaging device including sensing means, gage actuating means, one of said sensing and gage actuating means being fixedly mounted with respect to said slide and the other fixedly mounted with respect to said bed during gaging operation, said sensing means having a movable member actuated by said gage actuating means, a pair of switches in said gaging device actuated at spaced points in the travel of said movable member, means responsive to one of said switches for changing from coarse to fine grinding infeed of said slide and means responsive to the other of said switches for stopping infeed, and means for changing simultaneously by substantially like amounts the points at which said switches are actuated.

8. Infeed control apparatus for a grinding machine having a machine bed, a wheel slide movable inwards to bring a workpiece and grinding wheel into grinding engagement, and driving means controllable to produce infeed of said slide at relatively coarse and fine grinding rates, which comprises a gaging device including sensing means, gage actuating means, one of said sensing and gage actuating means being fixedly mounted with respect to said slide and the other fixedly mounted with respect to said bed during gaging operation, said sensing means having a movable mmeber actuated by said gage actuating means, a pair of switches in said gaging device actuated in response to movement of said movable member at predetermined points in the travel thereof, means responsive to one of said switches for changing said driving means from coarse to fine grinding infeed, means responsive to the other of said switches for stopping said driving means, means for changing relatively the points at which said switches are actuated, and means for changing simultaneously by substantially like amounts the points at which said switches are actuated.

9. Infeed control apparatus for a grinding machine having a machine bed, a wheel slide movable inwards to bring a workpiece and grinding wheel into grinding engagement, and infeed driving means for said slide controllable to produce infeed speed changeovers between rapid advance and initial grinding of said workpiece and between initial and final grinding thereof, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at a plurality of positions of said slide, means utilizing said control outputs to control said speed changeovers and to stop infeed, and means for changing simultaneously by substantially like amounts the positions of the slide at which said control outputs are produced.

10. Infeed control apparatus for a grinding machine having a machine bed, a wheel slide movable inwards to bring a workpiece and grinding wheel into grinding engagement, and means for infeed of said slide at rapid advance and a plurality of successively slower grinding speeds, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at a plurality of positions of said slide, means utilizing said control outputs to control successive speed changeovers from said rapid advance and successively slower grinding speeds to a stop infeed position, and means for changing simultaneously by substantially like amounts the positions of the slide at which said control output are produced.

11. Infeed control apparatus for a grinding machine having a machine bed, a wheel slide movable inwards to bring a workpiece and grinding wheel into grinding engagement, and driving means controllable to produce infeed of said slide at rapid advance and plurality of successively slower grinding speeds, which comprises a gaging device including sensing means, gage actuating means, one of said sensing and gage actuating means being fixedly mounted with respect to said slide and the other fixedly mounted with respect to said bed during gaging operation, said sensing means having movable means actuated by said gage actuating means to produce control outputs from said gaging device at a plurality of positions of said slide, means utilizing said control outputs for controlling said driving means to produce successive speed changeovers from said rapid advance and plurality of successively slower grinding speeds to a stop condition, means for adjusting with respect to each other the positions of the slide at which said control outputs are produced, and means for changing simultaneously by substantially like amounts the positions of the slide at which said control outputs are produced.

12. Infeed control apparatus for a grinding machine having a machine bed, a wheel slide movable inwards to bring a workpiece and grinding wheel into grinding engagement, and driving means controllable to produce infeed of said slide at rapid advance and a plurality of successively slower grinding speeds, which comprises a gaging device including sensing means, gage actuating means, one of said sensing and gage actuating means being fixedly mounted with respect to said slide and the other fixedly mounted with respect to said bed during gaging operation, said sensing means having a movable member actuated by said gage actuating means, a plurality of switches in said gaging device actuated in response to movement of said movable member at predetermined points in the travel thereof, means responsive to actuation of said switches for successively changing said driving means from said rapid advance through said plurality of successively slower grinding speeds to a stop condition, means for changing relatively the points at which said switches are actuated, and means for changing simultaneously by substantially like amounts the points at which said switches are actuated.

13. Infeed control apparatus for a grinding machine having a machine bed, a wheel slide movable inwards to bring a workpiece and grinding wheel into grinding engagement, and driving means for said slide controllable to produce an infeed speed changeover between initial and final grinding of said workpiece and to stop and retract said slide, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at at least two positions of said slide, timing means for initiating retraction of said slide a predetermined interval after actuation thereof, means utilizing the control output at one of said positions for controlling said speed changeover and at the other of said positions for stopping infeed, means utilizing the control output at said other position for actuating said timing means, and means for changing simultaneously by substantially like amouts the positions of the slide at which said control outputs are produced.

14. Infeed control apparatus for a grinding machine having a machine bed, a wheel slide movable inwards to bring a workpiece and grinding wheel into grinding engagement, and means for infeed of said slide at relatively coarse and fine grinding rates and for stopping and retracting said slide, which comprises gage actuating means, a gaging device including sensing means actuable by said gage actuating means, one of said gage actuating and sensing means being fixedly mounted with respect to said slide and the other fixedly mounted with respect to said bed during gaging operation, said gaging device and gage actuating means being adapted to produce control outputs at at least two positions of said slide, timing means for initiating retraction of said slide, a predetermined interval after actuation thereof, means utilizing the control output at one of said positions for changing from coarse to fine grinding infeed of said slide and at the other of said positions for stopping infeed, means utilizing the control output at said other position for actuating said timing means, and means for changing simultaneously by substantially like amounts the positions of the slide at which said control outputs are produced.

15. Infeed control apparatus for a grinding machine having a machine bed, a wheel slide movable inwards to bring a workpiece and grinding wheel into grinding engagement, and means for infeed of said slide at relatively coarse and fine grinding rates and for stopping and retracting said slide, which comprises a gaging device including sensing means, gage actuating means, one of said sensing and gage actuating means being fixedly mounted with respect to said slide and the other fixedly mounted with respect to said bed during gaging operation, said sensing means having a movable member actuated by said gage actuating means, switch means actuated in response to movement of said movable member at predetermined points in the travel thereof, timing means for initiating retraction of said slide a predetermined interval after actuation thereof, means responsive to actuation of said switch means at one of said points for changing from coarse to fine grinding infeed of said slide, means responsive to actuation of said switch means at another of said points for stopping infeed and actuating said timing means, means for changing relatively the points at which said switch means are actuated, and means for changing simultaneously by substantially like amounts the points at which said switch means are actuated.

16. Infeed control apparatus for a grinding machine having a machine bed, a wheel slide movable inwards to bring a workpiece and grinding wheel into grinding engagement, and driving means controllable to produce infeed of said slide at rapid advance and a plurality of successively slower grinding speeds and to stop and retract the slide, which comprises a gaging device including sensing means, gage actuating means, one of said sensing and gage actuating means being fixedly mounted with respect to said slide and the other fixedly mounted with respect to said bed during gaging operation, said sensing means having a movable member actuated by said gage actuating means, switch means in said gaging device actuated in response to movement of said movable member at successive predetermined points in the travel thereof, timing means for controlling said driving means to retract said slide a predetermined interval after actuation thereof, means responsive to actuation of said switch means at said successive points for changing said driving means from said rapid advance through said plurality of successively slower grinding speeds to a stop at the last point, means responsive to actuation of said switch means at said last point for actuating said timing means, means for changing relatively the points at which said switch means are actuated, and means for changing simultaneously by substantially like amounts the points at which said switch means are actuated.

References Cited in the file of this patent

UNITED STATES PATENTS

| | | |
|---|---|---|
| 2,329,382 | Blazek | Sept. 14, 1943 |
| 2,775,235 | Jessup | Dec. 25, 1956 |
| 2,802,312 | Gosney | Aug. 13, 1957 |
| 2,874,518 | Balsiger | Feb. 24, 1959 |